United States Patent Office 3,827,933
Patented Aug. 6, 1974

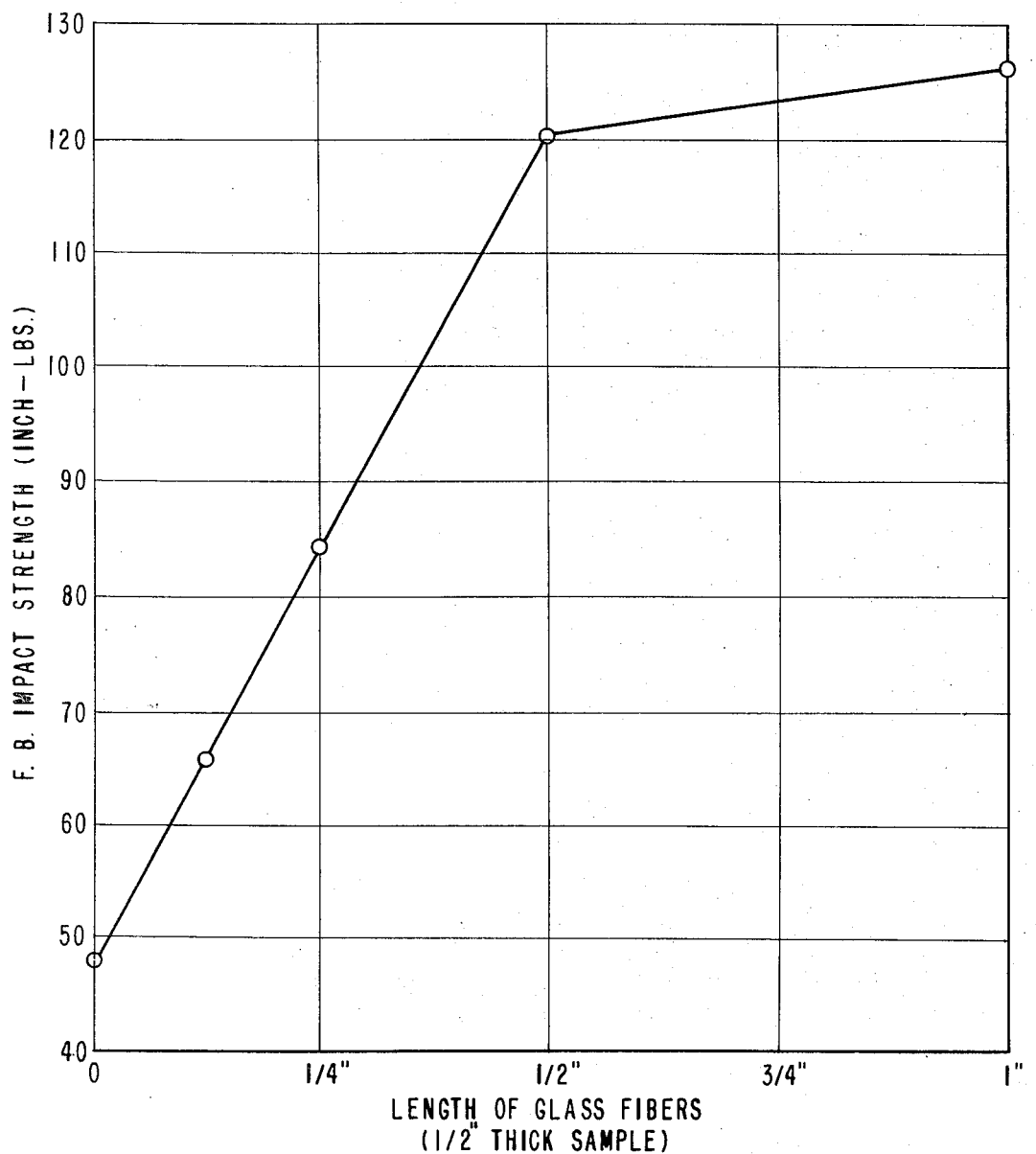

---

3,827,933
FILLED POLYMETHYL METHACRYLATE ARTICLE AND A PROCESS FOR ITS MANUFACTURE
Ray B. Duggins, Chadds Ford, Pa., and Henry C. Miller, Wilmington, and Eustachios Vassiliou, Newark, Del., assignors to E. I. du Pont de Nemours and Company, Wilmington, Del.
Filed Apr. 3, 1972, Ser. No. 240,650
Int. Cl. C08f 45/10
U.S. Cl. 161—176                                                  16 Claims

ABSTRACT OF THE DISCLOSURE

Disclosed herein is a filled polymethyl methacrylate article which, by virtue of the fact that it contains 50 to 80 percent by weight of particulate hydrate of alumina and 4 to 20 percent by weight of glass filaments preferably disposed within the article in discrete bundles aligned parallel to the plane of the article, is weather resistant, fire resistant and tough.

BACKGROUND OF THE INVENTION

Field of the Invention

This invention relates to filled plastic articles. More specifically, it relates to articles made from methyl methacrylate which contain a large proportion of a hydrated alumina, preferably aluminum trihydrate, and a minor proportion of glass filaments. Such compositions are weather resistant, flame resistant and tough. As such they are useful as roofing tiles, panels, sheet products and trim parts for the building industry.

Discussion of the Prior Art

Filled plastics and various methods for their manufacture constitute a well-developed art. Specifically, articles of manufacture comprising polymeric methyl methacrylate and an inert filler selected from a group of materials including alumina are disclosed in U.S. Pat. Re. 27,093. The use of aluminum trihydrate as a filler in polyesters to impart flame resistance is disclosed in an article by Connolly and Thornton in Modern Plastics 43, 154 (1965) and the specific use of aluminum trihydrate in methyl methacrylate articles is disclosed in copending U.S. application Ser. No. 3,524 for The Use of Hydrated Alumina in a Polymethyl Methacrylate Article, filed by R. B. Duggins on Jan. 16, 1970, now abandoned. Finally, the use of fiber glass as a filler in plastic system to impart impact strength is well known, and the combined use of aluminum trihydrate and fiber glass in plastic systems is disclosed in the Connolly and Thornton article discussed above.

In general, however, the use of glass filaments and aluminum trihydrate fillers in plastic systems are at odds with one another. The filler is used to impart flame resistance, and it is necessary to use large amounts of it (typically 50 to 60% by weight) to achieve a flame resistance rating that meets modern building code requirements, i.e., Class B or preferably Class A ratings. The fiber glass is used to impart impact strength, and again it is necessary to use large amounts of it (typically 30 to 50% by weight) to impart the toughness necessary to be useful in those same markets. In view of the need for sufficient plastic material to bind the structure together into a homogeneous mass (typically 20–40% by weight), it is difficult to find a combination of these ingredients which will produce a plastic article with both high impact strength and high flame resistance.

We have found that we can use as little as about 4 to 20% by weight of glass filaments and still produce an article with an impact strength suitable for use in the building industry. We have also found that by using discrete bundles of fibers with a length at least as long as the thickness of the article, generally aligned parallel to the surface of the article, the impact strength of the article can be increased markedly by using only a small amount, i.e., 4 to 14% by weight, of fiber glass. The use of such a small amount of fiberglass permits the use of larger amounts of hydrated alumina filler with a consequent increase in the flame resistance of the article. Finally, we have found that, surprisingly, the addition of a small amount of fiber glass, i.e., up to about 20% by weight, rather than reduce the flame resistance or have no effect upon it, actually improves the flame resistance of the structure to the extent that glass and aluminum trihydrate filled structures will achieve flame test ratings equal to or higher than those of samples containing about the same amount of aluminum trihydrate alone.

SUMMARY OF THE INVENTION

The above results have been achieved by producing an article comprising (a) about 50 to about 80% by weight of a hydrate of alumina in particulate form;
(b) about 4 to about 20%, preferably 4 to 14%, by weight of glass filaments having a length of about 0.1 to about 3.0 inches, preferably 0.1 to 1.0 inches; and
(c) about 20 to about 40% by weight of a polymeric constituent, the major portion of which is a methyl methacrylate polymer.

In the preferred embodiment, the hydrated alumina is aluminum trihydrate having a diameter of about 0.1 to about 70.0 microns. Also the glass filaments have a length which is generally at least as long as the thickness of the article and are disposed in the article in discrete bundles which are generally aligned parallel to the surface of the casting surface.

The article is manufactured by a process comprising the steps of: forming a polymerizable mixture containing (a) about 50 to about 80% by weight of a hydrate of alumina in particulate form;
(b) about 4 to about 20%, preferably 4 to 14%, by weight of glass filaments having a length of about 0.1 to about 3.0 inches, preferably 0.1 to 1.0 inches;
(c) about 20 to about 40%, preferably 20 to 35%, by weight of a polymerizable constituent, the major portion of which is a polymerizable methyl methacrylate constituent; and
(d) a small amount of an initiator system for the polymerizable constituent;

introducing the mixture onto a casting surface; and curing the mixture.

In the preferred process, the glass filaments have a length which is generally at least as long as the thickness of the article. They are also disposed in the mixture in discrete bundles, generally aligned in a direction parallel to the surface of the casting surface.

A variety of specific curing steps can be used in the practice of the present invention. A particularly impressive curing process, from the standpoint of the time required for curing the article, is disclosed in copending U.S. application Ser. No. 197,974, now U.S. Pat. No. 3,775,364 for a Process for Curing Methyl Methacrylate in the Presence of Peroxy Catalysts filed on Nov. 11, 1971 by Ray B. Duggins. Another particularly impressive cure system, from the standpoint of the ability and ease with which thein and highly filled articles can be made, is disposed in copending U.S. application Ser. No. 240,823, filed Apr. 3, 1972, now U.S. Pat. No. 3,780,156 for a Process for Making Filled Methyl Methacrylate Articles filed on the same day as this application.

DISCUSSION OF THE PREFERRED EMBODIMENT

Methyl methacrylate is mixed with filler and fiberglass and polymerized to form a useful article. Each ingredient provides desirable properties.

Weather resistance and a bonding matrix are provided by the poly(methyl methacrylate) resin.

Fire resistance is provided by keeping the resin content low and the filler content high. The filler contains a high concentration of water of hydration which is given off at combustion temperatures, thereby providing fire resistance by cooling the article and excluding oxygen. The filler is a hydrated alumina, preferably aluminum trihydrate, which is present in concentrations of about 50 to about 80% by weight of the article, preferably 55 to 65% by weight. The filler is in particulate form with a suitably small particle size. Aluminum trihydrate is sold by designation related to particle size, but the particles within a given grade or designation have a distribution of sizes. The sizes of the particles used as fillers will effect the ability of the resin to wet the particles, the distribution of the glass filaments within the mixture and the ease with which the mixture is cast or extruded. We have found that for these reasons, the particles used should preferably have a diameter ranging from about 0.1 to about 70.0 microns. Examples of aluminum trihydrate grades (listed in order of decreasing size) with particles which fall substantially within this range are those sold under the designation C-33, C-30BF, and Hydral® 710 by the Alcoa Company. Unless some other means is used to control the viscosity of the mixture, it is desirable to use a mixture of such fillers. An example of such a mixture, chosen to provide a distribution of particle sizes suitable to maintain the viscosity of the mixture in a range which will keep the fiberglass from separating during the process, is a mixture containing 75–90% C–30BF and 10–25% of Hydral® 710, both based on the total weight of the filler. Optionally, if some other means, discussed in Example 7 below, is used to thicken the resin, intermediate-sized particles (C–30BF) may be used as the only filler.

In addition to the first resistance provided by the low resin content and the hydrated filler content, the use of glass filaments unexpectedly provides an increase in fire resistance. Fiber glass is inert. Its presence in the article would not be expected to contribute to flame resistance by any mechanism other than by the fact that it replaces some of the resin which fuels the fire. We have found, however, that the use of a small amount of fiber glass, between 4 and 20% by weight, in an article containing a hydrated filler has a synergistic effect on flame resistance, as measured by those tests which simulate actual conditions on a burning roof.

Toughness or impact strength is provided by the glass filaments. While it is generally known that fiber glass provided in large quantities will improve the toughness of plastic articles, such quantities of fiber glass would decrease the amount of hydrated filler that could be used in such a structure. We have found that an article with sufficient impact strength for use in the building industry can be produced using about 4 to about 20% by weight of the fiber glass. We have further found that if the fiber glass is in the form of discrete bundles; and the bundles are generally aligned parallel to a plane tangent to the surface of the article or, if the article is flat, parallel to the plane of the article, then, the structure will have an impact strength considerably higher than a comparable structure with the fiber glass dispersed uniformly throughout the composition. The desired level of impact strength can then be achieved using about 4 to about 14% of fiber glass which allows for the use of additional aluminum trihydrate and leads to increased flame resistance. The glass filaments should have a length of about 0.1 to about 3.0 inches. Below about 0.1 inch, the impact strength of the article drops below that of commercial substitutes, such as slate, and above 1.0 inch, they produce a mixture that is difficult to work with, especially when the fibers are mixed in the mixture prior to casting. Fibers having a length of up to 3.0 inches can be used if the fibers are deposited on or between poured layers of the mixture. It is desirable for the glass fibers used to have a high bulk density, and also that the fiber bundles have a binder which has a low solubility in methly methacrylate monomer. Satisfactory grades are Johns-Manville CS-308A and R-308J. As can be seen by reference to the figure, which shows the increase in impact strength of a half-inch methacrylate article as a function of the length of the glass fibers used in the reinforcement, to maximize the reinforcement provided by the filaments they should preferably have a length which is at least as long as the thickness of the article. Alternatively, the filaments can be present in the structure in the form of woven fibers or nonwoven mats.

The polymer constituent of the present invention can be any methyl methacrylate polymer such as methyl methacrylate homopolymers and copolymers of methyl methacrylate with alphaethylenically unsaturated compounds (e.g., vinyl acetate, styrene, alkyl acrylates, acrylonitrile, alkyl methacrylates, multifunctional acrylic monomers, such as alkylene dimethacrylate and alkylene diacrylates, etc.). Therefore, the polymerizable constituent can be methacrylate monomer alone or mixed with other $\alpha,\beta$-ethylenically unsaturated compounds or mixed with some preformed polymer. In the preferred process, however, the polymerizable composition is formed from a sirup containing about 10 to about 45% by weight of methyl methacrylate polymer (preferably having an inherent viscosity of 0.25–1.0) dissolved in monomeric methyl methacrylate. The sirup can also include up to 20% by weight, preferably only a few percent, of ethylene dimethacrylate, as does the sirup described in U.S. Pat. 3,380,980.

The polymer-in-monomer sirup may be prepared by any of the methods described in British Pat. No. 870,191 or U.S. Pat. 3,154,600. Specifically, the sirup may be made by heating a small amount of a polymerization initiator in solution in the methacrylic ester and in the presence of a chain transfer agent at a suitable pressure and temperature. Heating is continued until the solution reaches a predetermined viscosity. Thereafter, the hot solution is quenched by the addition of cold monomer containing a polymerization inhibitor. More specifically, a sirup having a viscosity of 0.5–50 poises at 25° C. can be produced from methyl methacrylate by heating the monomeric methyl methacrylate in a jacketed kettle at a temperature of 50–150° C. under refluxing conditions. Atmospheric pressure is used and the refluxing material is stirred. Heating is conducted in the presence of a very small amount of initiator and from 0.05–1.0 mol percent of a chain transfer agent such as the alkyl mercaptans and the mercaptans described in U.S. Pat. 3,154,600. When a bulk viscosity in the range of 0.5 to 50 poises, which corresponds to an inherent viscosity of 0.25–1.0, is attained and the initiator content has been reduced substantially to zero, i.e., below 20 parts per million, the polymerization is stopped by cooling in any suitable manner. One method of cooling involves adding 1–10% by weight of cold methyl methacrylate containing sufficient hydroquinone or other polymerization inhibitor to inhibit further polymerization of the methyl methacrylate.

For the purpose of the present invention, the preferred sirup contains 10–45% by weight of the methyl methacrylate polymer dissolved in the methyl methacrylate monomer. The polymer has an inherent viscosity of 0.25–1.0 determined at 20° C. using a solution of 0.50 gram of the polymer per 100 milliliters of chloroform in accordance with the method described in F. W. Billmeyer, Textbook of Polymer Chemistry, Interscience Publishing Inc. (1957), page 128. As mentioned previously, the polymer may also be a copolymer involving a major portion of the methyl methacrylate monomer with such monomers as vinyl acetate, styrene, methyl acrylate, ethyl acrylate, butyl acrylate, cyclohexyl acrylate, ethyl methacrylate, butyl methacrylate, cyclohexyl methacrylate, etc.

The polymerizable composition may also contain a cross-linking agent added to the sirup in an amount up to 20%, preferably 0.5 to 2.0%, by weight upon completion of quenching. Any suitable poly-unsaturated, cross-linking agent may be used, e.g., ethylene glycol dimethacrylate, propylene glycol dimethacrylate, polyethylene glycol dimethacrylate, divinyl benzene, triallyl cyanurate, and diallyl phthalate. If desired, a portion, i.e., up to about 2% of the cross-linking agent, may be added to the preferred sirup composition prior to quenching.

Polymerization of the mixture can be accomplished by using any suitable initiator system such as from about 0.1 to about 2.0%, preferably about 0.6% of a conventional free radical initiator. Preferably the initiator is a peroxy compound or an azo compound. Lauroyl peroxide, t-butyl peroxypivalate and t-butyl peroxymaleic acid are examples of such initiators. A particularly rapid cure system is described in U.S. Patent application Ser. No. 197,974, now U.S. Pat. No. 3,775,364 the disclosure of which is hereby incorporated by reference into the present disclosure, for a Process for Curing Methyl Methacrylate in the Presence of Peroxy Catalysts filed on Nov. 11, 1971 by R. B. Duggins. This process involves adding to the polymerization constitutent, preferably the polymer-in-monomer sirup discussed above, a peroxy compound, a small amount of a chain transfer agent and 0.05 to 5.0 parts per hundred, based on the weight of the polymerizable material, of a promoter for the peroxy compound, such as water, alcohol, diols and triols having 1–6 carbon atoms. The peroxy compound is preferably a hemiperester of maleic acid, e.g., monotertiary-butyl peroxy-maleate sometimes referred to as t-butyl peroxy maleic acid, in combination with a basic compound of the desired metal. As such basic compounds, one may use any metal compound that will react with the acid substitute of the hemiperester to form the metal salt of the hemiperester. Although it is most practical to add the basic compound after first dissolving the hemiperester of maleic acid in the polymer-in-monomer sirup, it is not essential. In fact, a very useful mode of conducting the process involves the dissolution of the hemiperester in one portion of the sirup and the suspension of the basic compound in another portion of the sirup. As long as the two portions are kept separate, they each will have relatively long pot lives. However, when they are mixed or fed as two streams into a common container, rapid curing results. The curing may be accomplished autogenically by merely exposing the sirup containing the metal salt of the hemiperester of maleic acid to a temperature of 15–40° C. Although elevated temperatures and higher pressures may be used, they are not necessary with this cure system.

The mixture can be cast or extruded onto a casting surface which can be adapted to allow the mixture to cure autogenically or can be part of a compression mold so that the mixture can be subjected to a pressure of about 15 to about 1500 p.s.i. and a temperature of about 30° C. to about 130° C. for a time sufficient to cure the mixture. A vacuum applied to the mixture during the cure has the advantage of aiding in the removal of gas bubbles, a procedure that becomes more difficult as the filler and glass filament concentrations increase.

The fibers are added to the mixture in discrete bundles. While not essential, it is preferred that they be added to the mixture last so that the extensive mixing used to disperse the other ingredients throughout the mixture will not break the fibers or disturb the bundles. The bundles are added to the mixture last and stirred lightly by hand so that they will not break. The orientation takes place upon molding.

If the mixture is molded, the use of up to 5.0%, preferably about 0.1%, of a mold release agent such as zinc stearate or "Zelec"[1] UN lubricant is helpful.

The viscosity of the polymerizable mixture will affect the final product and the process for its manufacture. If the viscosity is too low, for example, the polymerization rate is decreased and, also, the glass filaments have a tendency to settle into one region of the mixture. If the viscosity is too high, the mixture is difficult to stir and it is difficult to achieve high filler loading, i.e., above about 65% by weight of filler and glass filaments. Not only is processing difficult, but the physical properties of the final product can be decreased. This is particularly true with thin structures, i.e. those having a thickness below half an inch. Control of the viscosity is one of the reasons why in the preferred embodiment, the diameter of the filler is in the range of 0.1 to 70.0 microns. Even in this range, some other means to decrease the viscosity of the mixture is desirable. One particularly useful method of reducing the viscosity is the process described in the aforesaid U.S. patent application Ser. No. 240,823, now U.S. Pat. No. 3,780,156, the disclosure of which is hereby incorporated by reference into the present discussion. This process involves the use of up to about 2.0%, preferably 0.1%, by weight of an acid, or an acid derivative, viscosity modifier to decrease the viscosity of the mixture and facilitate mixing of the ingredients and handling of the mixture. Any moderate length aliphatic monoacid having 6–20 carbon atoms or monoesters of diacids in which the acid precursor has 4–20 carbon atoms will produce some reduction in viscosity. The preferred materials are "Zelec"[1] UN lubricant, Zelec® (NE or NK) antistatic agents (all of which are fatty alcohol phosphate compositions which are mono or dialkyl esters of ortho phosphoric acid), "Aerosol"[2] OT surface active agent, octanoic acid, hexanoic acid, decanoic acid, dichloroacetic acid, monoesters of dicarboxylic acids such as monomethyl adipate, monomethyl maleate, monomethyl fumarate, monomethyl glutarate, monomethyl succanate, and the monoethyl ester maleic acid. When Zelec® UN lubricant is used, the material functions both as a mold release and as a viscosity modifier.

The important improvements obtained by the present invention will be more clearly understood by referring to the examples which follow. These examples, which illustrate specific embodiments of the present invention, should not be construed to limit the invention in any way.

EXAMPLES 1–3

A sirup of about 23% by weight of methyl methacrylate homopolymer dissolved in methyl methacrylate monomer is prepared by partial polymerization in situ and about 1.25% ethylene dimethacrylate is added to the mixture. This composition has received the designation of Lucite® Acrylic Sirup LE 1003. To this sirup are added t-butyl peroxymaleic acid (PMA), Ca(OH)$_2$, H$_2$O, ethylene glycol dimercaptoacetate (GDMA) and aluminum trihydrate (C–33) in various amounts as shown in Table I. Finally ⅛-inch fiber glass is added to the mixture in various

[1] Registered trademark of the E. I. du Pont de Nemours & Co.
[2] Registered trademark of the American Cyanamid Co.

amounts as shown in Table I. In Example 1, the glass is in the form of milled fiber glass. In examples 2 and 3, the glass is in the form of bundles which are added to the mixture and stirred gently to insure that the bundles are not broken.

TABLE I

|  | Example | | | Control A |
|---|---|---|---|---|
|  | 1 | 2 | 3 |  |
| LE 1003 | 28.2 | 28.2 | 38.2 | 38.2 |
| PMA | 0.5 | 0.5 | 0.5 | 0.5 |
| Ca(OH)$_2$ | 0.7 | 0.7 | 0.7 | 0.7 |
| H$_2$O | 0.4 | 0.4 | 0.2 | 0.4 |
| GDMA | 0.2 | 0.2 | 0.4 | 0.2 |
| C-33 | 64 | 64 | 54 | 60 |
| Fiber glass (milled) | 6 | 0 | 0 | 0 |
| Fiber glass (bundles) | 0 | 6 | 6 | 0 |

The mixture is poured into a mold and cured autogenically to form 1/8" sheets. The impact strength of the three structures made according to Examples 1–3 was tested by the falling ball impact test.

In the falling ball test, a 0.5 lb. steel ball is dropped repeatedly on a sample (1/8" x 3" x 4") supported on wood blocks 3" apart. The height of the ball is raised progressively, using 3" increments and beginning at two to five increments below the height expected to cause failure, and the height that the ball dropped from when failure occurred is recorded. Failure is defined as separation into two or more parts, or the appearance of an open crack on the upper surface, or bending of the two portions to form a line across the full width of the upper surface.

The results are compared with comparable measurements on Control A, and on slate (3/16" thick), asbestos shake (1/8" thick) and shingle tile (1/2" thick) in Table II.

TABLE II

| Structure | Polymer (percent approximate) | Filler (percent) | Fiberglass (percent) | Thickness (in.) | Falling ball impact strength (in. to failure) |
|---|---|---|---|---|---|
| Example 1 | 30 | 64 | 6 (milled) | 1/8 | 4.5 |
| Example 2 | 30 | 64 | 6 (bundle) | 1/8 | 18.0 |
| Example 3 | 40 | 54 | 6 (bundle) | 1/8 | 18.0 |
| Control A | 40 | 60 | 0 | 1/8 | 3.0 |
| Slate | | | | 3/16 | 3.0 |
| Shake | | | | 1/8 | 9.0 |
| Tile | | | | 1/2 | 12.0 |

From this table, it can be seen that the addition of as little as 6% of fiber glass will increase the impact strength of a 1/8" filled acrylic structure. Of even more importance, though not shown in the table, is the fact that the structure of Examples 2 and 3 are nailable (i.e., can be nailed to a substrate without cracking) whereas Control A is not. If milled fiber glass is used, the impact strength will be greater than that of slate, but if bundles are used, then an unexpectedly high increase in impact strength results.

EXAMPLE 4

To 300 parts of the sirup of Example 1 are added 1.8 parts of lauroyl peroxide initiator (LA) and 2.0 parts of Zelec® UN lubricant. Then 490 parts of Alcoa grade C-30BF aluminum trihydrate and 150 parts of Alcoa grade Hydral® 710 aluminum trihydrate are combined in a high speed blender with 0.5 parts of TiO$_2$ white pigment and 0.3 parts of carbon black. This filler-pigment mixture is then combined with the sirup mixture. Finally 60 parts of Johns-Manville grade CS-308A fiber glass (bundles) having a nominal length of 1/2" is added to the combined mixture and is stirred into the mixture by hand using a spatula.

The blend is then compression molded into sheets 1/8" x 15" x 15", using a press temperature of 105° C., a cure time of 10 minutes and a pressure of 178 p.s.i. As can be seen from Table III, the impact strength of unnotched specimens of the above composition, when measured according to the ASTM D-256 (modified-flatwise) test and the falling ball impact test, compares favorably with the impact strength of an unfilled acrylic sold under the trade name "Evr-Kleer" and with Buckingham-Virginia Slate.

TABLE III

| Material | Charpy (ft.-lbs./in.$^2$) | Falling ball height (in.) |
|---|---|---|
| Example 4 | 8.9 | 35 |
| "Evr-Kleer" | 6.6 | 28 |
| Slate | 0.7 | 12 |

EXAMPLES 5–6

In a process similar to that set forth in Example 4, the following ingredients are mixed.

TABLE IV

|  | Example 5 | Control B | Example 6 | Control C |
|---|---|---|---|---|
| LE 1003 | 29.2 | 29.2 | 29.2 | 29.2 |
| C-30BF | 47 | 47 | 42 | 42 |
| Hydral® 710 | 17 | 17 | 13 | 13 |
| LA | 0.6 | 0.6 | 0.6 | 0.6 |
| Zelec® UN | 0.2 | 0.2 | 0.2 | 0.2 |
| CaCO$_3$ | 0 | 6 | 0 | 15 |
| CS-308A (1/2") | 6 | 0 | 15 | 0 |

Each mixture is cast into matched metal molds and cured at a temperature of 108° C. and 1000 p.s.i. to form sheets having a thickness of 1/8". The Radiant Panel flame spread index (ASTM designation E-162-67) and the Oxygen index values (ASTM designation D-2863) were measured on these samples and the results are shown in Table V.

TABLE V

| Structure | Percent | | | | Flame spread index | Oxygen index (percent) |
|---|---|---|---|---|---|---|
|  | Polymer | Al$_2$O$_3$·3H$_2$O | CaCO$_3$ | Glass |  |  |
| Example 5 | 30 | 64 | 0 | 6 | 7 | 62 |
| Control B | 30 | 64 | 6 | 0 | 44 | 50 |
| Example 6 | 30 | 55 | 0 | 15 | 15 | 59 |
| Control C | 30 | 55 | 15 | 0 | 76 | 42 |

Both glass and CaCO$_3$ are supposedly inert insofar as their effect on flame resistance is concerned. Yet Table V shows that the use of 6% glass significantly increases the flame resistance of a 64% Al$_2$O$_3$·3H$_2$O filled acrylic sheet. It also shows that one can go from 6 to 15% glass without much change in the flame resistance of the structure. Such an increase in the fiber content will increase the impact strength significantly, so that the interaction between the aluminum trihydrate and the fiber glass allows a much greater flexibility in filler content than expected and yields a structure with an optimum combination of properties.

EXAMPLE 7

To 90.0 parts of the sirup of Example 1, 0.14 parts of t-butyl peroxymaleic acid and 0.40 parts of lauroyl peroxide are added. During the first minute of mechanical mixing, 0.224 parts of octanoic acid is added and during the next five minutes of mixing 192 parts of C-30BF aluminum trihydrate and 0.04 parts of water are added. After six minutes the mechanical mixing is stopped and 18 parts of Johns-Manville grade CS-308A fiber glass having a nominal length of 1/2" are added and hand mixed into the above mixture.

The mixture was poured into a metal mold, allowed to sit from two to five minutes during which time the viscosity increased due to polymerization. The mixture is then compressed for ten minutes under a pressure of 125 p.s.i. and a press temperature of 100° C. The mold was cooled and the filled article 1/8" x 14.5" x 14.5" in size removed.

A roof made from these samples laid as shingles on a 1/2" plywood base with a single layer of 30 lb. Phillip Casey fiber-rock roofing felt underlay achieves a Class A flame spread rating, a Class A burning brand rating, and a Class B intermittent flame rating when subjected to the roofing fire tests described in Underwriter's Laboratory pamphlet "UL–790."

EXAMPLES 8–9

Three samples are made according to the procedure set forth in Example 4. The first sample (Example 8) which is 1/8" thick contains 30% by weight methyl methacrylate, 64% by weight aluminum trihydrate and 6% by weight of 1/2" fiber glass. The second sample (Example 9) which is 0.105" thick differs from the first only in that 1/8" fiber glass is used. The third sample (Control D) which is also 0.105" thick contains 30% by weight methyl methacrylate, 70% by weight aluminum trihydrate and no fiber glass. Two 3" x 4" pieces of each sample are attached to a piece of 1/2" plywood, with a 1" overlap. A Meeker burner is positioned 1"–2" from the material and a hand held blower is used to simulate a wind. These conditions were designed to simulate, as well as possible on a small scale, the Underwriter's Laboratory flame spread test.

After 4 minutes of burning with simultaneous blowing, the Control D sample having no glass, was largely blown away in the burned area and smoke from the ignition of the plywood was noted. Example 9, the sample with 1/8" glass, showed far less tendency to blow away and smoke was not noted until after 11 minutes of burning. Finally, Example 8 the sample with 1/2" glass showed little tendency to blow away and even after 15 minutes no smoke was observed.

What is claimed is:
1. An article of manufacture comprising:
  (a) about 50 to about 80% by weight of alumina trihydrate in particulate form;
  (b) about 4 to about 14% by weight of glass filaments having a length of about 0.1 to about 3.0 inch disposed within said article in discrete bundles which are aligned parallel to the surface of said article; and
  (c) about 20 to about 40% by weight of a polymeric constituent the major portion of which is a methyl methacrylate polymer.
2. The article of Claim 1 wherein said glass filaments have a length of about 0.1 to about 1.0 inch.
3. The article of Claim 2 wherein said polymer constituent is a methyl methacrylate polymer selected from the group consisting of methyl methacrylate homopolymers and copolymers of methyl methacrylate with α,β-ethylenically unsaturated compounds.
4. The article of Claim 2 wherein said glass filaments have a length which is generally at least as long as the thickness of said article.
5. A poly(methyl methacrylate) article comprising:
  (a) about 50 to about 85% by weight of aluminum trihydrate particles;
  (b) about 4 to about 14% by weight of glass filaments having a length of about 0.1 to about 3.0 inches disposed within said article in discrete bundles aligned parallel to the plane of said structure; and
  (c) about 20 to about 40% by weight of a polymeric constituent, the major portion of which is a methyl methacrylate polymer, in the shape of a roofing tile or shingle.
6. The structure of Claim 5 wherein said glass filaments have a length of about 0.1 to about 1.0 inches.
7. The structure of Claim 6 wherein said glass filaments have a length which is at least as great as the thickness of said structure.
8. A process for preparing an article of manufacture, comprising the steps of: forming a polymerizable mixture containing
  (a) about 50 to about 80% by weight of alumina trihydrate in particulate form;
  (b) about 4 to about 14% by weight of glass filaments having a length of about 0.1 to about 1.0 inch disposed within said mixture in discrete bundles;
  (c) about 20 to about 40% by weight of a polymerizable constituent, the major portion of which is a polymerizable methyl methacrylate constituent; and
  (d) a small amount of an initiator system for said polymerizable constituent;
introducing said mixture onto a casting surface, and curing said mixture, whereby said discrete bundles are aligned parallel to the surface of said article.
9. The process of Claim 8 wherein said polymerizable mixture further comprises about 0.5 to about 20% by weight, preferably about 0.5 to about 2.0% by weight, of a cross-linking agent for said polymerizable constituent.
10. The process of Claim 8 wherein said polymer constituent is a poly(methyl methacrylate) constituent selected from the group consisting of methyl methacrylate homopolymers and copolymers of methyl methacrylate with α,β-ethylenically unsaturated compounds.
11. The process of Claim 8 wherein said polymeric constituent is a polymerizable sirup of methyl methacrylate containing 10–45% by weight of methyl methacrylate polymer.
12. The process of Claim 11 wherein said initiator system comprises a small amount of a peroxy compound, a small amount of a chain transfer agent, and 0.05 to 5.0 parts per hundred, based on the weight of the polymerizable constituent, of a promoter for said peroxy compound, selected from the group consisting of water and alcohols, diols and triols having 1–6 carbon atoms.
13. The process of Claim 8 wherein said glass filaments have a length which is at least as great as the thickness of said article.
14. The process of Claim 8 wherein said initiator system is a thermally activated catalyst containing a polymerization initiator selected from the group consisting of peroxy polymerization initiator compounds and azo polymerization initiator compounds.
15. The process of Claim 8 wherein said initiator system comprises t-butyl peroxymaleic acid, ethylene glycol dimercaptoacetate, calcium hydroxide and water.
16. The process of Claim 8 wherein said casting surface is part of a compression mold and the step of curing said mixture comprises subjecting said mixture to a pressure of about 15 to about 1500 p.s.i. at a temperature of about 80 to about 130° C. for a time sufficient to cure said mixture.

References Cited

UNITED STATES PATENTS

| | | | |
|---|---|---|---|
| 3,154,600 | 10/1964 | Munn | 260—884 |
| 3,563,939 | 2/1971 | Stevens et al. | 260—37 B |
| 3,362,942 | 1/1968 | Munn | 260—89.5 |
| 3,391,222 | 7/1968 | Robitshek | 260—41 AG |

FOREIGN PATENTS

| | | | |
|---|---|---|---|
| 676,324 | 12/1963 | Canada | 260—41 AG |
| 618,094 | 2/1949 | Great Britain | 260—41 AG |

OTHER REFERENCES

Modern Plastics Encyclopedia (1966), September 1965, vol. 43, No. 1A, pp. 608 and 611.

Terenzi et al., In I & EC Fundamentals, vol. 8, May 1969, p. 201.

Connolly et al., Modern Plastics, 43, p. 154, October 1965.

Hattori et al., Plastics Design and Pro., August 1967.

ALLAN LIEBERMAN, Primary Examiner

J. H. DERRINGTON, Assistant Examiner

U.S. Cl. X.R.

161—174; 260—41 AG, 41 B; 264—331